United States Patent [19]
Von Fange

[11] 3,821,739
[45] June 28, 1974

[54] MEANS FOR TESTING THE OPERATION OF COLLISION AVOIDANCE SYSTEMS

[75] Inventor: Wilbur H. Von Fange, Kirkwood, Mo.

[73] Assignee: McDonnell Douglas Corporation, St. Louis, Mo.

[22] Filed: July 6, 1971

[21] Appl. No.: 159,758

[52] U.S. Cl. .......................... 343/17.7, 343/112 CA
[51] Int. Cl. .............................................. G06g 7/78
[58] Field of Search ...................... 343/17.7, 112 CA

[56] References Cited
UNITED STATES PATENTS

| | | | |
|---|---|---|---|
| 2,781,511 | 2/1957 | Pear, Jr. | 343/17.7 |
| 2,852,771 | 9/1958 | Ruvin | 343/17.7 |
| 3,250,896 | 5/1966 | Perkinson et al. | 343/7.5 |
| 3,308,461 | 3/1967 | Von Fange | 343/17.7 |

*Primary Examiner*—Malcolm F. Hubler
*Attorney, Agent, or Firm*—Charles B. Haverstock

[57] ABSTRACT

An apparatus for improving the testing of synchronized collision avoidance equipment including apparatus for simplifying obtaining a synchronized condition of the equipment being tested and apparatus making possible the selection for evaluation of a plurality of individual sets of simulated test conditions for test purposes. The present apparatus also makes possible the simultaneous testing of any number of collision avoidance systems within line-of-sight range of the test apparatus.

15 Claims, 9 Drawing Figures

INVENTOR:
WILBUR H. VON FANGE
BY Charles B. Haverstock
ATTORNEY.

| MSG SLOT OF GND STA. | ALTITUDE XMTD (FT) | RANGE XMTD (NA. MI) | RANGE RATE XMTD (KNOTS) | TIME TO NEAREST APP. (SEC) | WARNING INDICATION |
|---|---|---|---|---|---|
| 490 | 600 | 1 | 000 | — | ⇧ 16 |
| 491 | 400 | 1 | 000 | — | NONE |
| 492 | 600 | 5 | 360 | 50 | ⇧ 16 |
| 493 | 600 | 7 | 360 | 70 | NONE |
| 494 | 10000 | 5 | 360 | 50 | ⇦ 20 |
| 495 | 12000 | 5 | 360 | 50 | NONE |
| 496 | 1600 | 18 | 1300 | 50 | ⇦ 20 |
| 497 | 1400 | 25.5 | 1300 | 70 | NONE |
| 498 | 1400 | 28.6 | 2060 | 50 | ⇩ 18 |
| 499 | 1400 | 40 | 2060 | 70 | NONE |

FIG. 9

MEANS FOR TESTING THE OPERATION OF COLLISION AVOIDANCE SYSTEMS

The present invention is an improvement over the systems and means disclosed in Perkinson et al U.S. Pat. No. 3,250,896, dated May 10, 1966, in Perkinson et al U.S. Pat. No. 3,369,239, dated Feb. 13, 1968, and more particularly the test means disclosed in Von Fange U.S. Pat. No. 3,308,461, dated Mar. 7, 1967, all of which patents are assigned to Applicant's assignee.

The systems covered by the above patents have all been thoroughly tested and found to operate satisfactorily for the purposes intended. However, as is true of many systems of the complexity and accuracy of the present systems, certain deficiencies and shortcomings appear after they have been in use and when deficiencies are recognized steps are taken to overcome them and to improve the operational accuracy thereof. Several ways to improve the systems disclosed in the above and other patents have been discovered and some of these are embodied in the subject matter of the present specification. One of the problems of the existing test means for collision avoidance systems including particularly synchronized systems has been their inability when operating in their test modes to be able to make individual tests of the different system functions and to allocate separate message slots for each test. Another shortcoming of known means to test synchronized systems is their inability to be able to synchronize all cooperating units with the least number of transmissions and to be able to simultaneously test any number of systems in line-of-sight of the test means. The present test means overcome these and other problems and shortcomings of existing test means and provide substantially improved means for testing the various functions of a multi-function system.

It is therefore a principal object of the present invention to provide improved test means for testing collision avoidance systems and the like.

Another object is to make possible the proper processing of test signals particularly at any line-of-sight range.

Another object is to provide improved means for allocating message slots for test purposes including test purposes whereby different distinct collision and non-collision situations are simulated.

Another object is to provide improved means for synchronizing on board aircraft collision avoidance units at any line-of-sight range without requiring that the units being synchronized transmit.

Another object is to provide means to enable the selection of individual tests for more intensive evaluation.

Another object is to provide more versatile and more selective means for trouble shooting, aligning and checking out collision avoidance equipment including synchronized collision avoidance equipment.

Another object is to expand the test capability of test means used for testing collision avoidance systems and the like.

Another object is to make it easier to pinpoint trouble in synchronized collision avoidance systems.

Another object is to enable use of a common message slot which occurs at the same time in repeating time intervals for synchronizing any number of units simultaneously for test purposes.

These and other objects and advantages of the present improved test means will become apparent after considering the following detailed specification which describes a particular embodiment thereof in conjunction with the accompanying drawings wherein:

FIG. 8 is a graph of range rate plotted against range to establish the boundary conditions between what represents a threat and what does not represent a threat; and, FIG. 9 is a chart showing different combinations of simulated conditions produced by the subject test means to test the various functions of a collision avoidance system or the like.

Figure 1:
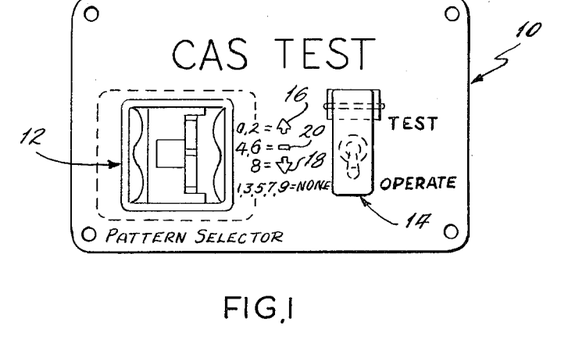
FIG. 1 shows a control panel for test purposes for mounting in an aircraft equipped with a synchronized collision avoidance system, said control panel being used to select a signal to test the various operational functions of the subject collision avoidance system.

Referring to the drawings more particularly by reference numbers, number 10 in FIG. 1 refers to a test panel for installing in an aircraft at some convenient location where it can be used to test the various operations of the aircraft's collision avoidance system to see that the system is operating properly. The test panel 10 includes a multi-position switch 12 which has a plurality of different setting positions corresponding respectively to each test to be made on the collision avoidance system. The switch 12 can be set to any of its different positions to individually test each different operating mode of the system, as will be explained. The test panel 10 also includes a test-operate switch 14 which is maintained in the operate position when the system is actually in use. During a test mode, however, which is a mode in which the various operating conditions of the system are checked out, the switch 12 is set to its different positions corresponding to different test message slots to make particular tests on the system and the switch 14 is moved to its test position.

The test panel 10 also includes an Up indicator arrow 16, a Down indicator arrow 18 and a Level-Off indicator 20. The indicators 16, 18 and 20 should be illuminated during certain tests but not during others if the system is operating properly. The Up indicator arrow 16, for example, is illuminated when the simulated test conditions are such that the pilot should receive a warning and be instructed to climb to avoid remaining on a collision course, the Down indicator arrow 18 is illuminated when the pilot should dive or descend to avoid collision, and the Level-Off indicator 20 should be illuminated when the pilot should level off during a climb or dive maneuver to avoid passing through the altitude of another aircraft, which except for its altitude, represents a collision threat.

Figure 2:
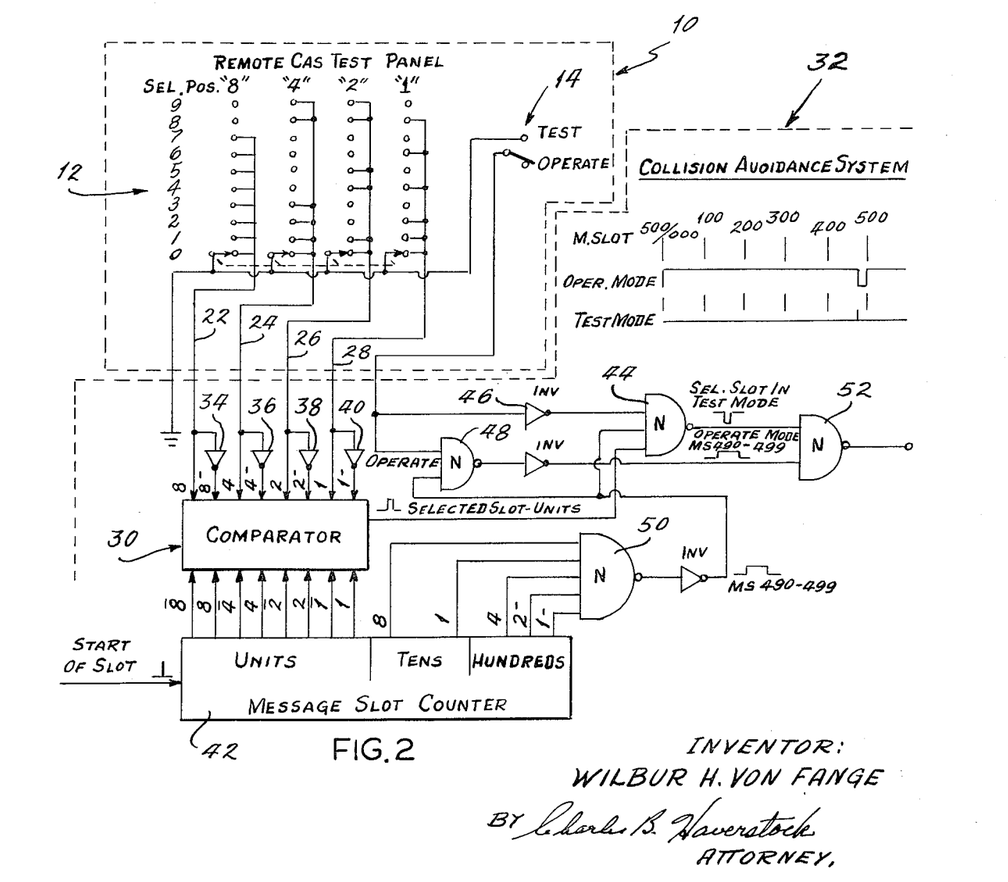
FIG. 2 is a schematic diagram showing some of the logic circuitry of the system test means embodied in the present invention.

FIG. 2 shows typical circuit connections for the multi-position selector switch 12, which together with the connections for the switch 14 are positioned inside of the dotted outline that corresponds to the control panel indicator 10. The selector switch 12 is shown having 10 different test setting positions labeled 0 to 9, and the switch is also shown as having four ganged together movable contacts which simultaneously move between the setting positions when the switch 12 is operated. One side of each of the movable switch contacts is grounded and the opposite sides make contact with stationary terminals on the switch 12, some of which are connected as shown to leads 22, 24, 26 and 28 and in turn to various points in a comparator circuit 30 that is part of the collision avoidance system indicated generally by the number 32. The several switch outputs are also connected through associated inverter circuits 34, 36, 38 and 40 to other inputs of the comparator circuit 30. The comparator circuit 30 has other input connections from a message slot counter circuit 42 which correspond, respectively, to the input connections it receives from the switch 12. For each setting of the switch 12 the comparator circuit 30 will produce an output when the input it received from the switch 12 corresponds with another input it receives from the counter 42.

The outputs from the comparator circuit 30 are fed as inputs to a NAND gate 44, which NAND gate 44 also receives other inputs whenever the test-operate switch 14 is closed on the test side. These other inputs pass through the switch 14 and through inverter circuit 46. The signal from the test-operate switch 14 also is applied as one of two inputs to another NAND gate 48, which also receives inverted outputs from another NAND gate 50. The NAND gate 50 has a plurality of inputs connected to receive particular outputs from the message slot counter 42 which correspond to the particular message slot depending on the setting of the switch 12. The output of the NAND gate 50 is also fed as a third input to the NAND gate 44. The normal outputs of the NAND gates 44, which are to be distinguished from inverted outputs, and the inverted outputs of the NAND gate 48 are used as inputs of another NAND gate 52. Typical inputs to the gate 52 are illustrated in the drawing and are used to make the selection of a particular desired test. To summarize, the outputs of the comparator circuits 30, which take into account the setting of the switch 12 and the message slot information, combine to select a particular test message slot under control of the setting of the switch 12. To accomplish this, the outputs of the NAND gate 44, representing the particular selected test message slot in the test mode, and the outputs of the NAND gates 50 and 48, combine in the logic circuitry to select the desired message slot for test purposes. These conditions are then ORed at the inputs to the NAND gate 52 in producing the outputs which cause the desired test conditions to be selected for each of the different setting positions of the multi-position switch 12 when the switch 14 is closed on its test side or the ability to gate out the test slots when switch 14 is closed to its operate side. The logic and other circuits just described are important because they enable an operator or maintenance person to be able to individually select any desired set of simulated test conditions in order to test each of the various operating functions that the collision avoidance system being tested is likely to encounter to see if the system is operating properly in all respects. This is to be distinguished from the test means disclosed in U.S. Pat. No. 3,308,461 which produces a pattern of simulated test conditions which occur in an uninterruptable sequence, and wherein the operator must know what a correct sequence looks like and must rerun the whole sequence each time he wants to test something but he has no way to reestablish the conditions necessary to simulate any particular set of conditions in order to test a particular operation or system function. Also, the present test means can be operated in any order and each test can be repeated as often as desired and the operator does not have anything to memorize or remember.

Figure 3:
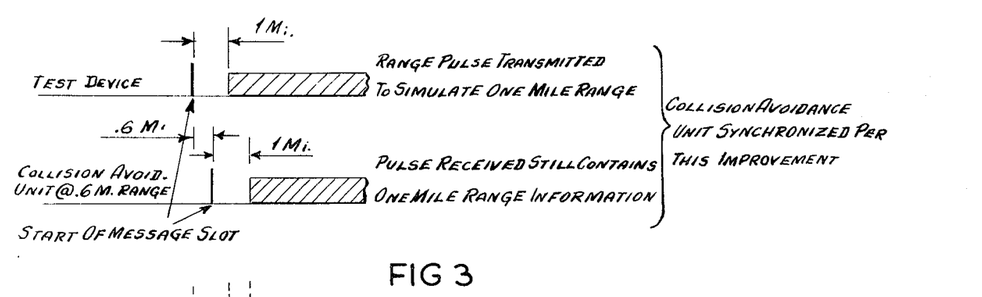
FIG. 3 shows a portion of a time sequence chart showing the time of occurrences of pulses employed to synchronize collision avoidance systems during testing thereof.
Figure 4:
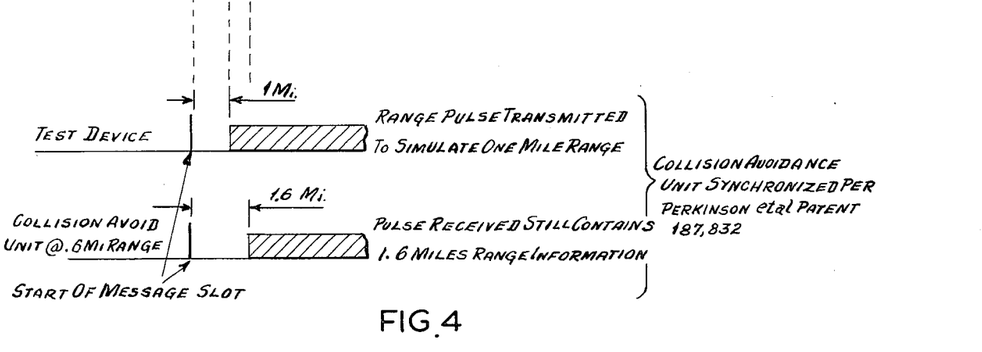
FIG. 4 shows a portion of a time sequence chart similar to FIG. 3 but illustrating instead the time of occurrences of pulses used for synchronizing purposes in a prior art collision avoidance system.

The present test means are designed primarily to be used to test a collision avoidance system in an aircraft when the aircraft is on the ground at some line-of-sight distance from the test equipment or ground station. The charts shown in FIGS. 3 and 4 illustrate how the collision avoidance system or systems under test is synchronized when airborne or otherwise when using synchronizing means such as disclosed in Perkinson et al U.S. Pat. No. 3,250,896. The chart of FIG. 3 shows the sequence used for synchronizing with the present system, and the chart of FIG. 4 shows how the same system would be synchronized using the earlier patented synchronizing means. In both cases, it is assumed that the aircraft is located a distance of 0.6 mile from the ground station and that a range pulse is transmitted to simulate a one mile range. In the prior art system, the signal received at the test device would contain the one mile simulated range plus a delay equal to the actual range of 0.6 mile, or the received signal would represent 1.6 miles of range. In other words, if the system being tested is synchronized to the ground station, the range signal will be received commencing at a time after the beginning of the message slot equal to a range of 1.6 miles. With the present means, on the other hand, (FIG. 3), a transmitted range signal that contains a simulated range of one mile will have its range displaced by 0.6 mile so that in the test mode for the present system the range signal will be received at the same time as before but in this case synchronization is obtained by one-way instead of two-way transmission and this makes a difference. This condition is possible to achieve simply by shifting the time of the beginning of transmission of the message slot at the aircraft by some arbitrary amount which in the case illustrated is equal to the actual distance between the aircraft and the ground station. This is an important feature of the present test means because it means that the present test means can be operated without requiring that the collision avoidance system in the aircraft transmit anything when in its test mode. This applies to all units under test within line-of-sight range of the test device. This means that only the test device need transmit a signal for re-sync purposes at some time in each cycle of the test mode. These resync signals are received at the unit being tested at the time that they should arrive if the unit being tested is synchronized. In other words, the resync signals should arrive late at the unit under test by an amount of time equal to the actual propagation time. This should be compared to the prior art synchronizing means wherein the collision avoidance system must transmit to the ground station in order to get back a resync pulse from which it can synchronize. The form of synchronizing used in the present test means are therefore simpler and less likely to cause trouble or error than if the regular means for synchronizing were used in the test mode.

The test mode synchronization of the present means can be obtained for short periods of time by accepting only coarse synchronization while inhibiting fine synchronization. This allows the system to be started up with a range error included and is the intent of the improved system disclosed herein. However, when using only coarse synchronization the oscillator should be allowed a warm up period for stabilization, and using the recommended method of fine synchronization at some fixed time allows system check out prior to complete oscillator warm up.

Figure 5:
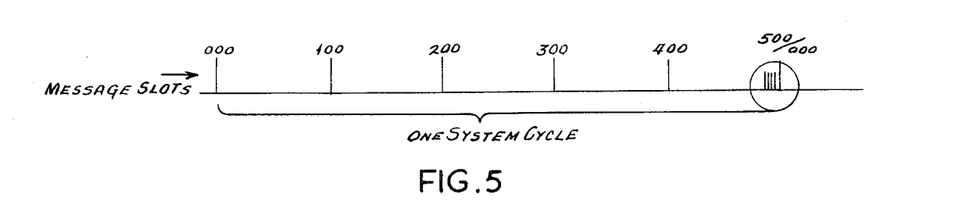
FIG. 5 shows a time sequence chart illustrating a particular arrangement of the message slots made available for testing the various functions of a collision avoidance system.
Figure 6:
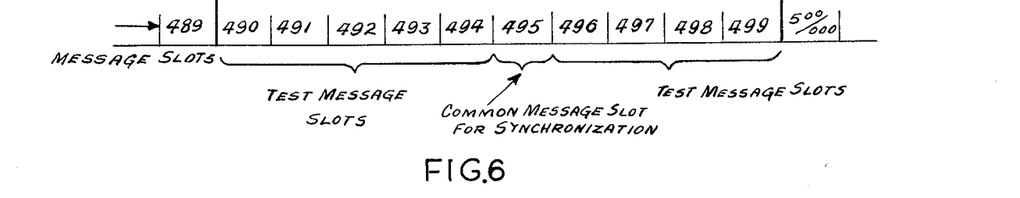
FIG. 6 is an enlargement of the circled portion of the chart of FIG. 5 to show the message slots assigned for test purposes.

Another advantage of the present system over the known prior art systems which has already been mentioned is that the present system assigns a separate test message slot for each test that is to be made. This is to be contrasted to the system disclosed in U.S. Pat. No. 3,308,461 wherein a sequence of tests occur in some established order or pattern but wherein no means are provided whereby each test can be conducted individually. Furthermore, in the patented system, all of the simulated tests in the sequence are performed in one or both of two message slots, and no means are provided or contemplated to isolate the individual tests. This means that when a test fails for some reason using the known construction, it is necessary to repeat the entire test operating sequence, each time remembering which test or tests checked out satisfactory and which failed. This places a burden on the operator to interpret the results and in some cases the situation is complicated by failures that may effect more than one test. This is not the case with the present device which makes possible the simulation of any test simply by setting the multi-position switch 12. This is a substantial advantage from the maintenance and operational standpoints and relieves the operator of the chore of having to be able to recognize when failures occur. It can therefore be seen that the present testing means has substantial advantages over known means used for the same or similar purposes including simplifying the synchronizing means employed during testing by eliminating the need for the unit being tested to transmit, and making it possible to conduct each test step individually and in any desired order. The present system also makes possible the assignment of selected message slots for resync and for test purposes. In a typical collision avoidance system having 500 or 1,000 message slots in repeating time periods of several seconds duration or so, some of the message slots, ten in the subject device as disclosed, are assigned to the test mode and are used to test all of the various circuit operating functions. FIG. 5 shows a typical operating period divided into message slots, some of which are assigned for test purposes. In this case, there are 500 message slots in the period and the test message slots are shown for illustrative purposes as the message slots 490 to 499 which are located in the circled part of the chart. It should be understood, however, that the test message slots can be located anywhere in the period and need not necessarily be located near the beginning or end, and it is not even necessary to group them all together although there may be advantages of orderliness in doing so.

The present test means can be used with collision avoidance systems which instruct the pilot to climb or dive when a coaltitude condition exists on some arbitrary basis such as on the basis of which plane has the lowest or highest numbered assigned message slot, as well as on some other basis such as on the basis of which aircraft is higher and which is lower in the coaltitude band. Systems of both types are disclosed in the above mentioned patents and in pending Perkinson U.S. patent application Ser. No. 10,907. In either case, a common test message slot (or slots) is assigned for synchronizing purposes, and this can be any one or all of the test message slots or it can be any other agreed upon message slot. The message slot or slots selected for synchronizing purposes can also be used for other test purposes as will be explained since, as explained aboveq the collision avoidance system being tested does not need to transmit when it is being tested.

Figure 7:
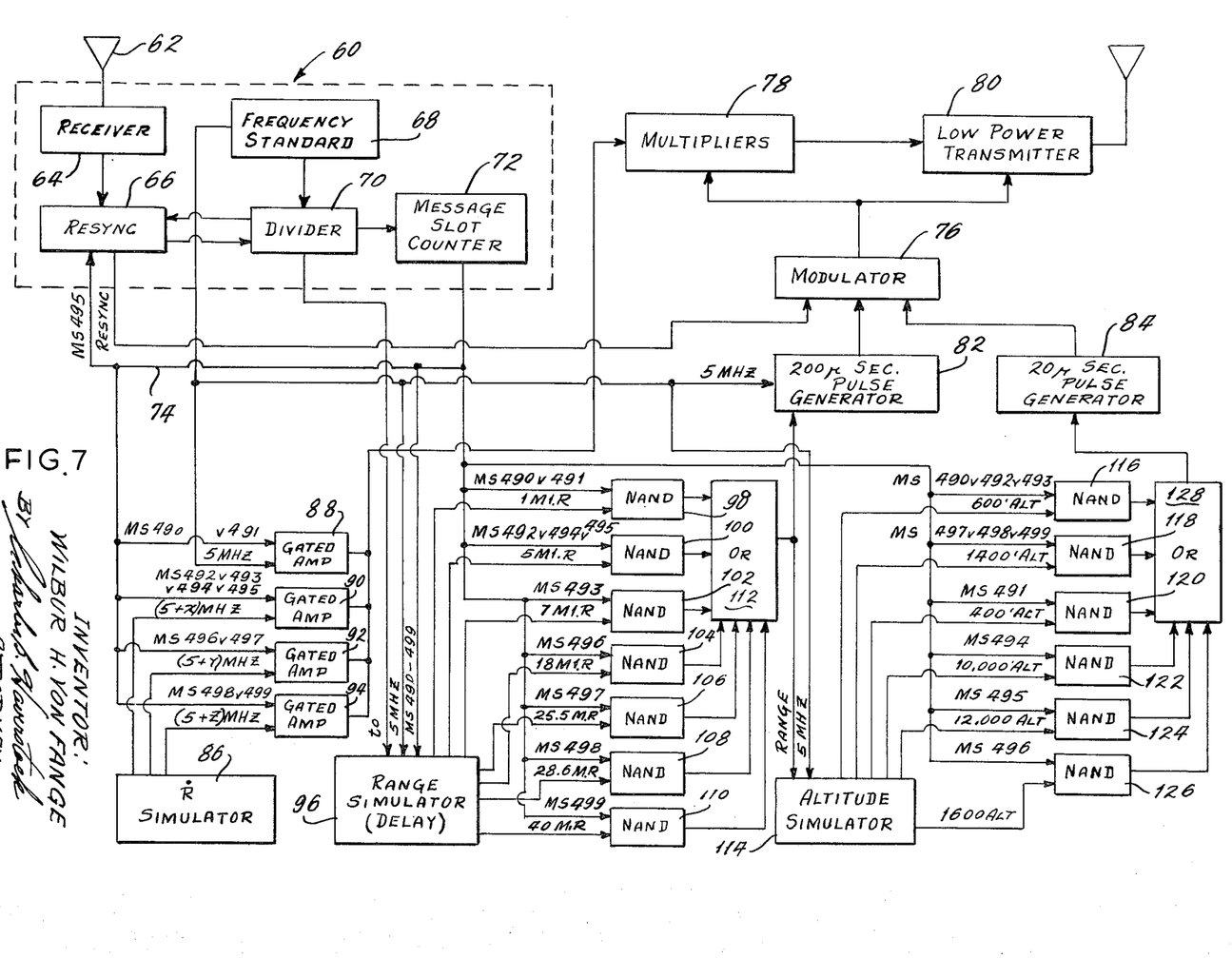
FIG. 7 is a block diagram of a circuit used for testing the operations of a collision avoidance system, said test circuit being constructed according to a preferred form of the present invention.

FIG. 7 is a block diagram somewhat similar to FIG. 1 in U.S. Pat. No. 3,308,461 but modified to include the more important improvements of the present test means. The elements included in the dotted outline 60 of FIG. 7 are the elements that are located at the ground station for the subject circuit, and they include antenna 62, receiver 64, resync circuit 66, frequency standard 68, divider circuit 70, and a message slot counter circuit 72. These elements are connected to each other as shown and may also have other connections to various parts of the ground station, some of which will be described in connection with the subject improvements and some not. In the patented construction, the output of the divider circuit 16 therein (70 in the present case) is used to control a test sequencer circuit which operates a plurality of ganged together multi-position switches which are mechanically moved from one position to the next over their full ranges in order to set up the conditions necessary to produce a sequence of simulated tests. In so doing, a test sequence is produced which covers all of the simulated tests in a continuous sequence to test all of the various operations of the particular collision avoidance system being tested. This is not so of the present device, which instead includes means by which a plurality of different simulated sets of test conditions can be established individually so that each system function can be tested separately and in any desired order. The tests that are simulated by the present test means are in some cases similar to the tests simulated by the patented test means, but in addition include other tests that have been added to test other system functions including particularly the function of the Level-Off indicator 20, as well as others. The simulated level off tests are included to test the system capability of presenting level off instructions during a climb or dive manuever when the aircraft under test will pass through or intersect a flight level occupied by another aircraft, which except for its present altitude, represents a threat of collision. This will be explained more fully later in the discussion of the various tests.

The test sequencer circuit and the associated ganged switches of the earlier construction have been replaced in the present construction by solid state switching means which have certain advantages particularly for a system such as the present system wherein the duration of the message slots employed is relatively short and may be insufficient at times to allow the use of mechanical sequencing switches. Also, as noted, with the present system, the test can be changed by simply changing the setting of the switch 12.

In the present circuit, test message slot 495 is assigned for synchronizing purposes and all of the other test message slots, namely, test message slots 490–494 and 496–499, as well as slot 495, are used for establishing the different simulated test conditions that are used to test the operations of the collision avoidance system. Referring to FIG. 7, a lead 74 designated MS495 is connected between the output of the message slot counter 72 and the resync circuit 66 and this lead is used in the circuit that produces the test resync operations. If resync in other test slots is desired, the test slots would be decoded from the message slot counter 72 and fed on the line 74 to the resync generating circuitry 66. The resync circuit 66 has an output that is connected to a modulator circuit 76, and the modulator 76 has other input and output connections including an output connected to multipliers 78, an output connected to a low power transmitter circuit 80, and inputs which are connected to the outputs of a 200 microsecond pulse generator 82 in the range simulator circuits and a 20 microsecond pulse generator 84 in the altitude simulator circuits.

Synchronizing is accomplished with the present circuit by a sync-time resync pulse which is generated in message slot 495 or in any other agreed upon message slot reserved for this purpose. The synchronizing pulse from the circuit 66 triggers the modulator circuit 76 which in turn keys the multipliers 78 and the transmitter 80. Any collision avoidance unit operating in the test mode within line-of-sight range of the ground station will receive the synchronizing pulse. In all of the other message slots used in normal operation, the output of the resync circuit 66 is advanced or delayed from the fixed resync time established for the message slot 495 by an amount of time which is a function of the time at which a transmission is received from a collision avoidance unit by way of the receiver 64.

Figure 9:
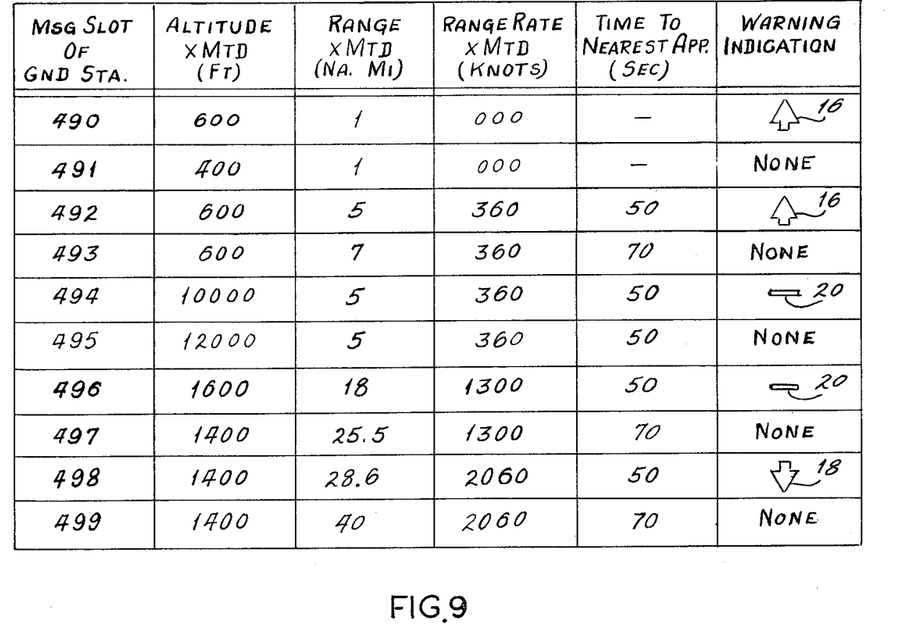

Before proceeding with further explanation as to the circuit in FIG. 7, reference should be made to the chart in FIG. 9, which shows the various combinations of conditions that can be simulated to test a collision avoidance system. The first column in FIG. 9 is labeled "Message Slot of GND. STA." and identifies the various test message slots from 490 to 499.

Figure 8:
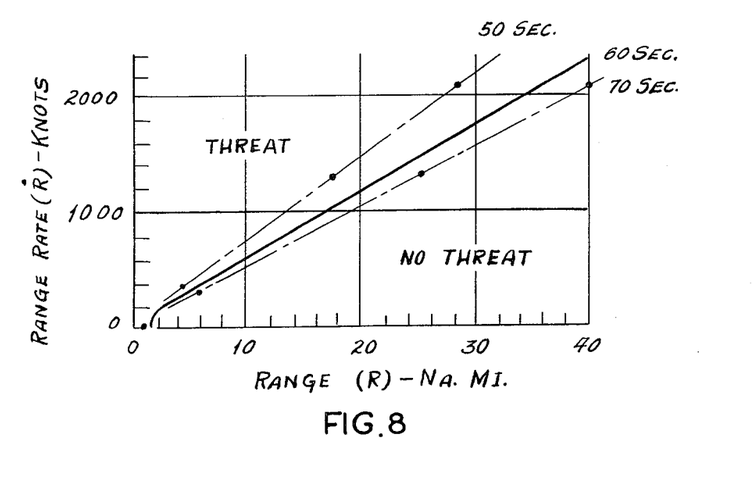

The second column in FIG. 9 is labeled "Altitude XMTD (ft.)" and the altitudes indicated opposite each test message slot are the altitudes simulated for each of the tests. The altitudes shown are by way of example only and many other simulated altitude conditions as well as other ranges and range rates can be used as well. The particular altitudes selected for illustration, however, and their combination with the other simulated conditions as set forth in the chart of FIG. 9 establish all or most of the typical conditions that will be encountered by the system when in operation. Some of the simulated conditions have also been selected because they are relatively close to the border line between conditions that constitute a threat and those that do not. This is done intentionally to check the closeness of the operating accuracy of the systems as illustrated by the graph in FIG. 8 that defines the boundary between threat and non-threat conditions.

The third column in the chart of FIG. 9 labeled "Range XMTD (Na.Mi)" lists the simulated ranges for each test, the fourth column labeled "Range Rate XMTD (knots)" lists the simulated range rates, the fifth column labeled "Time To Nearest App. (Sec.)" lists the times to nearest approach in seconds (obtained from a combination of the columns three and four ranges and range rates), and the last column labeled "Warning Ind." shows the type of warning, if any, that the pilot should receive for each set of the simulated conditions transmitted from the ground station to the aircraft being tested.

In the operation of the present test means it is assumed for reasons of example, that the ground station altitude is 1,000 feet and that a coaltitude condition exists when the aircraft in which the unit is being tested is located at an altitude of 1,000 feet plus or minus 500 feet. In addition to the above assumption, a present predicted altitude of 11,000 feet is simulated in the aircraft equipment when the test mode is selected with switch 14. The predicted altitude in this case refers to an altitude through which the aircraft being tested could pass during the next 60 seconds time interval and is based on the assumption that the aircraft is capable of achieving a climb rate up to 10,000 feet per minute. If the simulated range and range rate information shows a possibility of a conflict between two aircraft based on its prediced altitude at some future time, the Level-Off indicator 20 will be energized warning the pilot that he should level off rather than continue in his present climb or dive maneuver.

The present test means include a range rate simulator circuit 86 which has its outputs connected to inputs of certain gated amplifier circuits which are shown as circuits 88, 90, 92 and 94. These circuits control some of the input signals that are fed to the multipliers 78. The gated amplifier circuit 88 receives two inputs including a 5 MHz signal from the frequency standard 68 and inputs from a message slot counter 72. These inputs occur during the first two test message slots 490 and 491. The other three gated amplifier circuits 90, 92 and 94 receive inputs respectively from the range rate simulator circuit 86 at frequencies $(5 + x)$ MHz, $(5 + Y)$ MHz, and $(5 + z)$ MHz, and each of these gated amplifiers also receives an input from the message slot counter 72 in certain of the test message slots as indicated on the drawing. For example, the gated amplifier 90 receives inputs during the test message slots 492, 493, 494, and 495, the gated amplifier 92 receives inputs from the message slot counter 72 during test message slots 496 and 497, and the gated amplifier 94 receives inputs from the message slot counter 72 during test message slots 498 and 499.

The signals received by the amplifier 90 from the range rate simulator 86 at frequency $(5 + x)$ MHz are signals whose frequency is slightly shifted with respect to the 5 MHz fundamental frequency from the frequency standard 68, and which when multiplied will correspond to a closing range rate of 360 knots. This simulated closing range rate is used in several of the tests as indicated in the fourth column of FIG. 9. The signals from the range rate simulator 86 that are fed to the gated amplifier 92 have a frequency of $(5 + y)$ MHz, where $y$ represents a greater frequency deviation from 5 MHz than $x$, and when multiplied will provide a simulated closing range rate of 1,300 knots. This range rate is used for the tests that are made in test message slots 496 and 497. In similar manner, the gated amplifier 94 receives signals from the range rate simulator 86 which are displaced from 5 MHz by $z$ MHz, $z$ being a greater deviation than $x$ and $y$, and when multiplied establish a simulated range rate of 2,060 knots which is used for the tests made in message slots 498 and 499. All of the outputs of the gated amplifiers 88–94 are connected together and fed as inputs to the multipliers 78. It can therefore be seen that the gated amplifiers together with the range rate simulator 86, and the inputs from the message slot counter 72 provide the simulated range rate test conditions for the various tests.

Referring again to FIG. 7, the circuit shown includes a range simulator 96 which receives a plurality of the inputs including an input at time $t_0$ from the divider circuit 70, an input at frequency 5 MHz from the frequency standard 68, and inputs from the message slot counter 72 corresponding to each of the test message slots 490–499. The range simulator 96 generates a plurality of outputs which are delayed signals that represent different simulated ranges, and these outputs are fed to NAND gates 98, 100, 102, 104, 106, 108 and 110. The range rate simulator 96 is activated at the beginning time $t_0$ of each test message slot and is driven at the time 5 MHz frequency long enough to provide seven different delays equivalent to the various simulated ranges which in the embodiment shown are equal to 1, 5, 7, 18, 25.5, 28.6 and 40 nautical miles (see FIG. 9). A lumped-constant delay line could also be used, if desired. As each of the test message slots is reached an associated one of the gates 98–110 will be enabled, and the enabled gate will also receive the appropriate range pulse which will trigger the 200 microsecond pulse generator 82. The actual triggering of the generator 82 will be by a signal from the particular enabled gate which passes through an Or gate 112 that has its output connected to the pulse generator 82, which in turn feeds the modulator 76. The output of the Or gate 112 also has a connection labeled "Range" which is connected to the input of an altitude simulator circuit 114 to energize the altitude simulator 114 which then proceeds to count at the 5 MHz rate starting from the beginning of each received range pulse in order to produce six other time delays which are necessary to simulate the six possible simulated altitude conditions shown in Column 2 of the chart in FIG. 9. Again, a lumped-constant delay line could be used for this purpose, if desired. These simulated altitude signals are fed as inputs to appropriate NAND gates 116–126 which NAND gates are enabled by the associated test message slot signals from the message slot counter 72 corresponding to the respective test message slots 490–499. The outputs of the NAND gates 116–126 operate through another Or gate 128 to trigger the 20 microsecond generator 84 which in turn feeds the modulator 76. It can therefore be seen that the circuit that includes the altitude simulator 114, the NAND gates 116–126, the Or gate 128, and the pulse generator 84 provides the simulated altitude test information, and this information together with the simulated range and range rate information is sufficient to establish the various test conditions which are different in each of the test message slots. As already noted, the present test means can be used to simultaneously provide simulated data as to range, range rate and altitude to any number of collision avoidance systems to be tested, which systems are located in aircraft within line-of-sight of the ground station.

Following is a brief step-by-step description of the operation of the circuits just described. The operation will be described beginning with the switch 12 in its position corresponding to the test message slot 490. In this position, the gated amplifier 88 will be used to amplify the 5 MHz signal it receives from the frequency standard 68, and will feed its output to the multipliers 78 to transmit at the times when the modulator circuit 76 is keyed. The modulator 76 is controlled by the two pulse generators 82 and 84 which in turn are controlled by range and the altitude pulses received under control of the Or gates 112 and 128 respectively. In the first test message slot the 200 microsecond pulse generator 82 will be activated by a signal from the Or gate 112 which receives its input from the NAND gate 98 thereby producing a range delay equivalent to one mile under control of the range simulator circuit 96. In like manner, the 20 microsecond pulse generator 84 will be activated or triggered under control of a signal from the Or gate 128 which receives its input from the NAND gate 116 also in the first test message slot 490 providing an altitude delay equivalent to an altitude of 600 feet as controlled by the altitude simulator 114.

Referring again to FIG. 9, it can be seen that for a simulated altitude of 600 feet, a range of 1 mile and a simulated range rate of zero knots, a warning condition exists and the Up Arrow indicator 16 should be energized. This will be true in systems that use altitude difference to determine the direction of an indicated escape maneuver, recalling that the aircraft in the subject test is assumed to have a preset altitude of 1,000 feet. Therefore, if the transmission from the test equipment simulates an aircraft flying at 600 feet, which is 400 feet lower than the aircraft under test but within the coaltitude band an Up Warning should be given. In systems based on an arbitrary assignment of maneuvers such as on the basis of which aircraft is assigned the higher and which the lower message slot, the same warning will be given if the testing aircraft assumes slot 495 is the above/below dividing line. For example, the test message slots 490–494 are lower in number than the test message slots 496–499 and for test purposes this difference can be used as the basis for determining which indicator 16 or 18 will be energized. As long as the switches 12 and 14 on the test panel remain in the same positions, that is in message slot 490 and in the test position, the Up Arrow indicator 16 will continue to be illuminated for some percentage of the total time such as for 75 percent or 80 percent of the time that the test remains on. To some extent the arrow on time will depend on the location or distance of the unit being tested relative to the transmitter at the test means.

For the second test, the switch 12 is moved to its position corresponding to test message slot 491. In this position the simulated range and range rate will be the same as for the previous test but the simulated altitude will be changed from 600 feet to 400 feet which is below and outside of the 500 feet downward limit of threat band necessary to produce a warning condition in the assumed example. Thus for this test, no warning indication should be produced, and if a warning is produced it means there is a malfunction or trouble somewhere in the system. This might mean, for example, that the coaltitude band is displaced downwardly far enough to include an altitude difference of 600 or more feet which is enough to cause the Up Warning Arrow to be illuminated, as in the previous test. In connection with this test, reference should be made to the gated amplifier circuit 88 in FIG. 7, and to the NAND gate 98, both of which remain active as in the first test. The new simulated altitude, however, is under control of the NAND gate 120 instead of the NAND gate 116 to provide the simulated altitude of 400 feet.

For the third test, switch 12 is moved to its position corresponding to message slot 492 and the simulated test conditions producd are as indicated in FIG. 9. In this case, the simulated altitude is 600 feet, the simulated range is 5 miles, and the simulated range rate produced by a simulated Doppler shift is 360 knots. These simulated range rate and range conditions establish a time to nearest approach of 50 seconds, 60 seconds defining the boundary between a threat and no threat condition whenever a coaltitude condition also exists. In this case, as in the first test described above, a coaltitude condition exists and since the test unit is assumed to be at 1,000 feet the Up Warning Arrow 16 should be energized. If the system being tested gives arbitrary opposite instructions to coaltitude aircraft based on which has the lower and which the higher message slot assignment the up arrow will be displayed because the simulated intruder has a slot number lower than slot 495.

The fourth test takes place in message slot 493 and is similar to the third test except that it uses a simulated range of 7 miles instead of 5 miles. In this case, the 7 mile range results in a calculated time to nearest approach of 70 seconds which is greater than the boundary condition of 60 seconds, and therefore, even through a coaltitude condition exists, no warning will be given.

The fifth test occurs with the switch 12 in position corresponding to test message slot 494. In this position the simulated range and range rate conditions are the same as were used in test number 3 (message slot 492) but the simulated altitude is established at 10,000 feet. The 10,000 foot simulated altitude used in test number 5 is to test the prediction portions of the collision avoidance system which are the portions that project for altitude changes that are in process. In this case, the collision avoidance system being tested will have a present predicted altitude which looks for all intruders below 11,000 feet which is a band that extends 10,000 feet upwardly from the present altitude of 1,000 feet. This is based on an assumed maximum rate of altitude change or climb rate of 10,000 feet per minute. Except for the altitude separation of 9,000 feet that exists in this test the simulated range, range rate and time to nearest approach of 50 seconds are sufficient to establish a warning display. Under these conditions, assuming the aircraft under test is in a climbing configuration, the Level Off indicator 20 should be energized to advise the pilot to terminate his climbing maneuver by leveling off to prevent placing his aircraft in a potentially dangerous position. For test number 5, the range and range rate are simulated using the same gating means used for test 3 above, and the simulated altitude is produced by the NAND gate 122 (FIG. 7).

Test number 6 in message slot 495 uses the same simulated range and rate rate as test number 5 but uses a simulated altitude of 12,000 feet which is 1,000 feet beyond the prediction band which can result in a level off warning. Under these conditions, assuming a same maximum possible rate of altitude change of 10,000 feet per minute, no warning should be produced if the collision avoidance system under test is operating properly. In this test case, the simulated altitude is under control of the NAND gate 124.

Test number 7 which occurs in test message slot 496 establishes a simulated range rate of 1,300 knots under control of gated amplifier 92, and a simulated range of 18 miles under control of NAND gate 104, the combination producing a time to nearest approach of 50 seconds, The simulated altitude for test number 7 is established at 1,600 feet under control of the NAND gate 126 and these conditions should produce a level off warning if the system is operating properly. If, under these test conditions, the present altitude band should be shifted upwardly due to some failure or adjustment error in the system it might be possible for the Down Arrow 18 to be energized instead of the Level Off indicator 20.

Test 8 which occurs in test message slot 497 establishes a simulated altitude of 1,400 feet which is in the coaltitude band of the system under test and the simulated range is increased to 25.5 miles. The simulated range rate for this test is 1,300 knots. The range and range rate condition establish a time to nearest approach of 70 seconds which is outside of the threat band and too long a time to produce a warning condition. Therefore in test number 8 no warning should be given if the system is operating properly. This test is particularly designed to check the Doppler portion of the system. If A Doppler error exists, a Down Arrow indication might erroneously be given. The simulated range, range rate and altitude conditions for step number 8 are under control of NAND gate 106, gated amplifier 92 and NAND gate 118, respectively.

Test number 9 occurs in test message slot 498 and establishes a simulated range rate of 2,060 knots under control of the gated amplifier 94 using a Doppler shifted frequency of $(5 + z)$ MHz, as explained above. The simulated range of 28.6 miles for test 9 is under control of NAND gate 108, and the simulated altitude of 1,400 feet is under control of NAND gate 118. These simulated conditions should cause the Down Arrow indicator 18 to be energized if the system is operating properly. Likewise, the Down Arrow will be displayed on systems configured to give arbitrary opposite instructions to coaltitude aircraft based on which has the lower and which the higher message slot assignment because slot 498 which represents the simulated intruder is higher than the message slot 495.

The tenth and last test shown occurs in test message slot 499 and establishes the same simulated altitude and range rate as test 9, but the simulated range of 40 miles for test 10 is under control of the NAND gate 110. The simulated range and range rate conditions produce a 70 second time to nearest approach, which being greater than the 60 seconds boundary condition, should prevent the production of any warning if the system is operating properly.

For systems configured to give aircraft above-below or limit climb/limit dive advisories, the same techinque as described herein can be expanded to give tests in the altitude bands above and below.

If all of the test steps described above are performed satisfactorily, the collision avoidance system or systems being tested will be operating properly and accurately. The various simulated test conditions selected for use have been selected because they establish test conditions which are fairly near to the border-line between what is considered to be a threat and what is considered to be a safe condition, and if the system will operate accurately in these borderline situations it should also be able to operate accurately under other less border-line conditions. It should be realized, however, that the simulated test conditions described are described merely for illustrative purposes and many other simulated conditions could be used without departing from the spirit and scope of the invention. For instance, the threat/no threat boundaries of FIG. 9 may be selected to be 25 or 30 seconds instead of 60 seconds as shown, with the ± 10 seconds accuracy band shifted appropriately and increased or decreased to equal the capability of the equipment being tested. The important thing is that the present test means enable an operator or maintenance person to set up and make individual tests of the various system elements and operations of any number of collision avoidance systems, and the tests can be performed in any sequence and one or more of the tests can be repeated as many times as necessary. Also, with the present system it is possible to establish and maintain any number of test conditions for a long enough period for corrective actions to be taken when a fault is discovered. The fact that the present test means can be used to simultaneously test any number of collision avoidance systems within line-of-sight thereof or within line-of-sight of its antenna is an important feature. It is also important that this can be done without requiring that the individual units being tested transmit any signals including transmitting synchronizing or other information signals.

The subject test means are designed to be included as part of a permanent ground station installation at an airport or other location. It is also possible and contemplated to install the subject test means at some remote location or even make them airborne so that inflight testing and maintenance checks of collision avoidance systems can be made. The range of the present test means can also be varied depending on circumstances, including the geography of the test location, although for best operation the present test means should be operated on a line-of-sight basis.

Thus there has been shown and described improved means for testing collision avoidance systems and particularly collision avoidance systems which are synchronized to each other and to a ground station, which test means fulfill all of the objects and advantages sought therefor. It is apparent, however, that many changes, modifications, alterations, variations and other uses and applications of the present means are possible and are contemplated by the present invention, and all such changes, modifications, alterations, variations, and other uses and applications which do not depart from the spirit and scope of the invention are deemed to be covered by the invention which is limited only by the claims which follow.

What is claimed is:

1. Means for producing simulated signals corresponding to preselected conditions of altitude, range and range rate to test the operations of a time synchronized collision avoidance system comprising means for producing and transmitting signals having predetermined frequency, means for dividing said transmitted signals into time periods subdivided into a plurality of message slots some of which are reserved for test purposes, means for modulating said signals in the test message slots according to predetermined conditions of simulated altitude, range and range rate, means for controlling the transmission of the modulated signals during said test message slots to establish different combinations of the simulated conditions of range, range rate, and altitude, said last named means including means to produce respective responses to simulate different conditions of range, range rate and altitude and gate circuit means to select different combinations of the simulated conditions for transmission during different respective ones of the test message slot, and means located at the system being tested for selecting particular ones of the transmitted test message slots and the simulated conditions transmitted therein for test purposes, said last named means including a multi-position switch movable to different positions corresponding to respective ones of the test message slots.

2. The means defined in claim 1 wherein the system under test includes means for evaluating the threat of collision based on comparison of a predetermined altitude with the simulated altitude modulated into the signals received during selected ones of the test message slots and on the range and range rate, said system also including means for predicting the occurrence of future threats based on receipt of simulated altitude, rang and range rate information taking into account an arbitrary maximum rate of altitude change, said test means including other means for further modulating the signals transmitted during selected test message slots to test the prediction mechanism of the system.

3. The means defined in claim 2 wherein the system under test includes means for producing a level off instruction on receipt of signals modulated to simulate range, range rate and altitude conditions which except for the present altitude of the system under test would establish a threat including means for taking into account an arbitrary maximum rate of altitude change capability.

4. The means defined in claim 1 wherein the test means include a plurality of gate circuits connected to selectively simulate different altitude conditions for transmission in different test message slots.

5. The means defined in claim 1 wherein the test means includes a plurality of gate circuits connected to selectively simulate different range conditions for transmission in the different test message slots.

6. The means defined in claim 1 wherein the test means include a plurality of gate circuits connected to selectively simulate different range rate conditions for transmission in the different test message slots.

7. The means defined in claim 1 wherein one or more of said test message slots is assigned for synchronizing the time of occurrence of the repeating time intervals and of the message slots at the system under test to the time of occurrence of the repeating time intervals and message slots at the test means so that they occur substantially simultaneously, said synchronizing means including means for transmitting a synchronizing signal in one of the said test slots which is received at the system under test at a later time in the same test message slot based on an established line-of-sight distance between the test means and the system under test.

8. Means for modulating transmitted signals to simulate predetermined conditions comprising transmitting means, means for generating a signal at a predetermined frequency to be transmitted, means for time modulating said signal to simulate predetermined conditions of range, range rate and altitude, said signal generating means including means for establishing recurring time periods subdivided into a plurality of intervals, and means for transmitting during selected ones of said plurality of reserved time intervals time modulated signals to represent different combinations of simulated range, range rate and altitude, means for selecting and reserving particular ones of the time intervals for test purposes, located at the system being tested, the means for selecting particular ones of the reserved time intervals including gate circuit means having inputs respectively responsive to the times of occurrence of different ones of the message slots reserved for test purposes for controlling the selection of particular ones of the test message slots, and other inputs to the respective gate circuit means for selecting the time modulated signals to represent different combinations of simulated range, range rate and altitude to be associated with each selected test message slot, said last named means including simulator means to simulate different combinations of range, range rate and altitude, said simulator means having separate outputs at which the different simulated conditions occur, and means connecting different selected ones of the simulator outputs to the other inputs of the gate circuit means.

9. The means defined in claim 8 wherein said time modulating means includes a first gate circuit channel having an input source of signals timed to represent different simulated ranges, a second gate circuit channel having an input source of signals timed to represent different simulated range rates, a third gate circuit channel having an input source of signals timed to represent different simulated altitudes, a multi-position switch and associated gate means, said switch being movable to different setting positions corresponding to different ones of the test time intervals and circuit means operatively connecting the first, second and third gate circuit channels and the said associated gate means to produce a different combination of simulated range, range rate and altitude for each setting position of the switch.

10. Means for testing units of a collision avoidance system and the like, each system unit including means for receiving signals at a predetermined frequency from the test means, said signals being encoded to simulate different combinations of information as to range, range rate and altitude for test purposes, each unit also including means for making a determination from the simulated information signals it receives whether a threatening condition exists and producing an appropriate warning display for each threatening condition that is identified, the improvement comprising means for testing the units of such a collision avoidance system to see if they are operating properly under various test conditions, said test means including means for establishing a plurality of recurring distinct times for test purposes, means for generating responses to represent respectively different simulated conditions of range, range rate and altitude, gate circuit means for applying different selected combinations of the range, range rate and altitude responses to the transmissions during the different distinct times, means for transmitting different combinations of the simulated conditions at different distinct times, and means at the units being tested for selecting particular ones of the distinct times including the associated combination of simulated range, range rate and altitude for test purposes, said means including multi-position switch means having a setting position corresponding to each of said distinct times.

11. Means for testing the operational performance of multi-function collision avoidance systems which include means for evaluating the possibility of a collision on the basis of altitude separation, range and range rate between aircraft, said parameters being used by the system to establish boundary conditions and to produce appropriate escape maneuver instructions when the combination of parameters represent a collision threat, said test means including means for establishing repeating transmission time periods each subdivided into a plurality of individual message slots, means for simulating different combinations of range, range rate and altitude for transmitting to a collision avoidance system to be tested in different distinct ones of the message slots, said distinct ones of the message slots being test message slots, said means for simulating different combinations or range, range rate and altitude in the different test message slots including means to generate responses to respectively represent different ranges, range rates and altitudes for test purposes, and gate circuit means for matching different combinations of the simulated conditions to different ones of the test message slots for transmission therein, other means for transmitting to the collision avoidance system information signals which enable the system under test to be synchronized timewise in the time periods and message slots of the test means, and means on the system to be tested including multi-position switch means having a different setting position and associated circuitry corresponding to each test message slot that can be selected for test purposes, the setting of said switch selecting a particular one of the said test message slots and the associated distinct combination of simulated range, range rate and altitude for receipt and evaluation by the system under test to determine if certain system functions are operating and performing properly, said system functions including means to produce an appropriate escape maneuver instruction whenever the combination of simulated conditions produced in the selected message slots are such that they establish a simulated threat of collision.

12. Means for producing and transmitting different combinations of simulated test conditions for testing the various operations of collision avoidance systems that include means for evaluating the threat of collision based on receipt of the simulated conditions including a comparison of the system altitude with the transmitted simulated altitude and based on the transmitted simulated range and range rate, the system means for evaluating the threat of collision including means establishing criteria for distinguishing between those combinations of altitude, range and range rate conditions that constitute threatening and those that do not constitute threatening situations and producing an appropriate escape maneuver instruction whenever a combination of the conditions establish a threatening situation, said means for producing and transmitting simulated test conditions including means for establishing similar repeating time intervals each subdivided into a plurality of distinct message slots some of which are reserved for assignment to different collision avoidance systems and others of which are reserved for test purposes, means for transmitting in different ones of the message slots reserved for test purposes signals modulated to simulate different combinations of altitude, range and range rate for receipt by a system under test, said last named means including means to generate responses to respectfully represent different distinct simulated altitudes, ranges and range rates for test purposes, and circuit means for selecting and relating different combinations of the simulated conditions for transmission during the different test message slots, means at the system being tested for selecting between the different test message slots reserved for test purposes to test and evaluate system operating functions based on the simulated conditions transmitted in the said selected test message slot, and other means for selecting between normal system operation and system operation in a test message slot.

13. The means defined in claim 12 wherein the means for selecting a particular test message slot include a multi-position selector switch having a plurality of setting positions corresponding respectively to the different test message slots.

14. The means defined in claim 12 including means for synchronizing the time of occurrences of the repeating time intervals and of the message slots into which the time intervals are subdivided at the system under test to the time intervals and message slots produced by the test means so that they will occur substantially simultaneously, said synchronizing means including means at the test means for transmitting a signal for synchronizing purposes in each occurrence of a selected one of the test message slots.

15. The means defined in claim 12 wherein each system under test includes means for projecting its altitude based on an arbitrary assumed maximum rate of altitude change capability in order to be able to predict possible future occurrences of conditions that will create a threat of collision, said altitude projection means including means producing a level-off instruction whenever it is predicted that a maneuver involving a change in altitude will result in establishing the conditions necessary to produce a threat.

* * * * *